United States Patent
Heymel et al.

(10) Patent No.: US 12,326,191 B2
(45) Date of Patent: Jun. 10, 2025

(54) PLANETARY GEARBOX AND LUBRICANT-COLLECTING TRAY FOR A PLANETARY GEARBOX

(71) Applicant: Schaeffler Technologies AG & Co. KG, Herzogenaurach (DE)

(72) Inventors: Jan Heymel, Erlangen (DE); Alfred Hock, Höchstadt/Aisch (DE); Frederic Fischer, Weisendorf (DE); Florian Boehm, Leinburg (DE); Dominik Sauer, Pettstadt (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/689,972

(22) PCT Filed: Aug. 19, 2022

(86) PCT No.: PCT/DE2022/100616
§ 371 (c)(1),
(2) Date: Mar. 7, 2024

(87) PCT Pub. No.: WO2023/036361
PCT Pub. Date: Mar. 16, 2023

(65) Prior Publication Data
US 2024/0401692 A1    Dec. 5, 2024

(30) Foreign Application Priority Data
Sep. 7, 2021   (DE) ............... 10 2021 123 097.7

(51) Int. Cl.
*F16H 57/04*   (2010.01)
*F16H 47/08*   (2006.01)
*F16H 57/08*   (2006.01)

(52) U.S. Cl.
CPC ....... *F16H 57/0471* (2013.01); *F16H 57/043* (2013.01); *F16H 57/045* (2013.01); *F16H 57/0486* (2013.01); *F16H 57/082* (2013.01)

(58) Field of Classification Search
CPC .. F16H 57/0471; F16H 57/043; F16H 57/045; F16H 57/0486; F16H 57/082; F16H 57/0423; F16H 57/0427; F16H 57/0426
See application file for complete search history.

(56) References Cited

U.S. PATENT DOCUMENTS

| | | | |
|---|---|---|---|
| 8,491,436 B2 * | 7/2013 | Duong | F16H 57/042 475/159 |
| 2009/0247347 A1 | 10/2009 | Choi | |
| 2009/0247348 A1 * | 10/2009 | Haupt | F16C 33/6677 475/159 |

FOREIGN PATENT DOCUMENTS

| | | | | |
|---|---|---|---|---|
| DE | 3929743 A1 * | 4/1990 | ......... | F16H 57/0482 |
| DE | 19736688 A1 | 2/1992 | | |

(Continued)

*Primary Examiner* — Tinh Dang

(57) ABSTRACT

A planetary gearbox includes a shaft, a planetary carrier, first and second planetary pins arranged on the planetary carrier, first and second planetary gears mounted on the planetary pins via respective bearings, and a lubricant collecting tray. The shaft has a shaft channel for radially conducting a lubricant to an outer face of the shaft and the planetary pins have respective pin channels for conducting the lubricant to the respective bearings. The lubricant-collecting tray has a collection space for collecting the lubricant supplied via the shaft channel and hollow feed ports that open into respective pin channels. The hollow feed port closest to the shaft channel, when viewed in a circumferential direction, has an opening cross-section that is less than an opening cross-section of the other hollow feed port.

16 Claims, 2 Drawing Sheets

(56) References Cited

FOREIGN PATENT DOCUMENTS

| | | | |
|---|---|---|---|
| DE | 102005054084 A1 | 7/2007 | |
| DE | 102008000900 A1 | 10/2009 | |
| DE | 102015215280 A1 * | 2/2017 | ......... F16H 57/0426 |
| DE | 102016206745 A1 | 10/2017 | |
| DE | 102016222444 A1 | 5/2018 | |
| DE | 102018123592 A1 | 3/2020 | |
| DE | 102018128057 A1 | 5/2020 | |
| DE | 102019108050 A1 | 10/2020 | |
| DE | 102019121079 B3 | 11/2020 | |
| EP | 2317181 A1 | 5/2011 | |
| EP | 3560829 A1 | 10/2019 | |
| JP | 2010041887 A | 2/2010 | |
| JP | 2010071400 A | 4/2010 | |
| JP | 2014181793 A | 9/2014 | |
| JP | 2015102193 A | 6/2015 | |

* cited by examiner

PLANETARY GEARBOX AND LUBRICANT-COLLECTING TRAY FOR A PLANETARY GEARBOX

CROSS-REFERENCE TO RELATED APPLICATIONS

This application is the United States National Phase of PCT Appln. No. PCT/DE2022/100616 filed Aug. 19, 2022, which claims priority to German Application No. DE102021123097.7 filed Sep. 7, 2021, the entire disclosures of which are incorporated by reference herein.

TECHNICAL FIELD

The present disclosure relates to a planetary gearbox, with a lubricant-collecting tray.

BACKGROUND

Planetary gearboxes are used in a wide variety of applications. They are used, for example, in vehicle transmissions, such as hybrid transmissions. Planetary gears are rotatably mounted on planetary pins arranged on a planetary carrier via suitable bearings, usually rolling bearings in the form of needle bearings, wherein the planetary gears mesh with a ring gear in a manner known per se. A corresponding lubricant device or lubricant supply is provided to supply lubricant to the bearings of the planetary gears. On the one hand, this device includes a channel structure provided on the central shaft, for example a channel running along the shaft axis, from which a further channel branches off radially, which opens on the outer face of the shaft.

A lubricant-collecting tray is also provided, which has a collection space for the lubricant supplied via the channel and escaping from it, i.e., in which the lubricant is collected. Feed ports, corresponding in number to the number of planetary pins, extend from the bottom of the collecting tray and communicate, on the one hand, with the collection space and, on the other hand, with a channel structure provided in each planetary pin. The lubricant coming from the collection space is fed to the channel structure on the planet pin-side via the respective feed port, and is fed to the bearing via the pin-side channel structure.

DE 10 2008 000 900 A1 discloses an example of such a planetary gearbox. The shaft is provided with a central channel for carrying lubricating oil, from which a channel transversely leads into a gap between gears and a planetary carrier. The lubricating oil flows from the gap via an axial bearing to a lubricant-collecting tray. The collection space of this lubricant-collecting tray radially follows a guide plate, which also has a raceway for the needles of the axial bearing.

The lubricant-collecting tray has a number of feed ports corresponding to the number of planetary pins of the planetary gearbox, each of which is inserted into a bore of a planetary pin. The feed ports extend from a channel-like collection space of the lubricant-collecting tray, which is delimited axially towards the planetary carrier by a sealing disc and opposite the feed ports by a cover disc, so that the lubricating oil is collected in the collection space delimited by the sealing disc and the cover disc. The openings of the feed ports open into the lubricant-collecting tray at the sealing disc and are located inside the collection space so that the lubricating oil collected therein can be fed to the planetary bearings via the feed ports.

DE 10 2016 206 745 A1 discloses a planetary gearbox in which two axially consecutive planetary sets can be supplied with lubricating oil by means of one and the same lubricant-collecting tray. The cover disc of the lubricant-collecting tray facing the other planetary set has through openings for this purpose, which are approximately at the level of the feed port openings opposite the collection space. The lubricating oil collected in the collection space thus proportionally reaches both the planetary bearings of one planetary set through the feed ports and the other planetary set via the through holes.

Another planetary drive is disclosed in DE 10 2018 123 592 A1, the planetary bearing of which, as soon as the planetary carrier rotates, should preferably be supplied with lubricating oil from an oil sump by means of a lubricant-collecting tray. The collection space of the lubricant-collecting tray which is used therein is separated in the circumferential direction by partition walls. The partition walls divide the collection space into a number of collection sections corresponding to the number of feed ports. The partition walls are positioned at the openings of the respective feed port in such a way that the opening can be optimally supplied with lubricating oil even if the direction of rotation of the planetary carrier is reversed.

The channel structure of the shaft often only has one radially extending channel opening on the outside of the shaft, through which the lubricant, usually an oil, is discharged to the outside. As a result, the lubricant is only applied locally at one point, which means that there is no even distribution around the shaft circumference. This means that there is also no homogeneous lubricant distribution in the collection space as viewed around the circumference, which in turn means that the lubricant flow to the individual feed ports is also not uniform due to this inhomogeneity.

Due to the fixed positional relationship of the lubricant-collecting tray to the planetary carrier or planetary pin, on the one hand, and to the shaft on the other, more lubricant collects in the region of the collection space which is adjacent to or directly in the extension of the shaft-side channel than in regions offset in the circumferential direction and in particular the opposite region. This in turn means that the feed port which is positioned closest to the opening of the shaft-side channel, as viewed in the circumferential direction, is supplied with a larger amount of lubricant than the feed ports arranged offset thereto in the circumferential direction.

The inhomogeneous lubricant supply over the shaft could be counteracted by providing a plurality of radial channels around the shaft circumference so that the lubricant is delivered at a plurality of positions as viewed in the circumferential direction. Ideally, the number of channels would correspond to the number of feed ports and thus planetary pins. However, not least for reasons of strength in relation to the shaft, the formation of a plurality of such channels is not always practical, which is why often only one radially extending channel is provided. The inhomogeneous lubricant supply results in different levels of lubrication of the respective bearings, which is reflected in the differing temperature behavior of the planetary pins.

SUMMARY

The present disclosure provides, in a planetary gearbox of the type mentioned at the outset, that a feed port positioned, viewed in the circumferential direction, closer to the opening of the channel has a smaller opening cross-section than a feed port positioned further away.

According to the disclosure, the feed ports provided on the lubricant-collecting tray have different opening cross-sections, and the respective smaller or larger opening cross-section depends on the position of the feed port relative to the opening of the one shaft-side channel, viewed in the circumferential direction. The feed port, which is positioned closest to the opening as viewed in the circumferential direction, where the largest amount of lubricant accumulates as described, has a smaller opening cross-section and thus flow cross-section than a feed port positioned further away as viewed in the circumferential direction. At least two feed ports, but usually more, for example three or more feed ports, of course corresponding to the number of planetary pins and planetary gears, are provided distributed in the circumferential direction. The virtually position-dependent change or adjustment of the opening or flow cross-sections of the individual feed ports can therefore be used to react to the inhomogeneity with regard to the amount of lubricant present in the collection space, viewed in the circumferential direction.

This is because less lubricant is supplied to the feed port closest to the opening, as it has the small or smallest opening or flow cross-section, so that less lubricant reaches the bearing point, while more lubricant is supplied to the feed port or ports located further away in the circumferential direction, so that slightly more lubricant is supplied to the associated bearings than via the adjacently positioned feed port. Overall, the design or variation of the opening or flow cross-sections of the feed ports is naturally selected in such a way that approximately the same amount of lubricant is supplied to each planetary pin and thus to each bearing during operation, so that a homogeneous lubrication is achieved despite the given inhomogeneity on the part of the lubricant collection.

If, for example, three feed ports are provided, the feed port with the smallest opening or flow cross-section is expediently positioned virtually in a radial extension of the channel or opening, while the other two feed ports have a slightly larger opening or flow cross-section and are positioned offset by 120° to the first feed port. However, due to the same angular offset, they have the same opening cross-section. If, for example, four feed ports are provided, a first feed port with the smallest opening cross-section is positioned in a radial extension of the channel, two further feed ports, which have a larger opening cross-section but both have the same opening cross-section, are positioned offset by 90°, while a fourth feed port is positioned offset by 180°, which then has the largest flow cross-section. This reflects the fact that the largest amount of lubricant is ultimately present around the circumference immediately adjacent to the channel opening, while the smallest amount of lubricant is present in the region 180° opposite.

The opening cross-section can be varied in different ways. As such, according to a first variant, each feed port can have a bore, and the bore diameter of the individual feed ports is different in order to vary the opening cross-section. The feed ports, which may be hollow-cylindrical as they engage in the pin holes in the assembly position, have a cylindrical bore, and the bore diameter can be easily varied in order to vary the opening cross-section. This means that the opening or flow cross-section is controlled by means of the inner diameter.

In an alternative variant, one or more feed ports can also have an orifice which reduces the opening cross-section, e.g., provided at the end of the feed port which is open towards the collection space. In this case, the cross-section is varied via a geometric reduction in cross-section in the form of an orifice, which means that an orifice control is provided here. The orifice, which protrudes more or less far into the hollow-cylindrical bore of the respective feed port, for example, is expediently located in the transition to the collection space, but could also be positioned at the other end.

It is also conceivable that the planetary carrier has a cheek extending radially to the shaft, using which it is connected to the shaft and which is adjoined by an annular bottom on which the feed ports project axially. In this way, the planetary carrier can be easily connected to the shaft, while at the same time, due to the transition of the cheek surface to the bottom of the tray, the lubricant can also be guided accordingly via this cheek. In a further development, the cheek can have a lubricant guide structure on the side facing the lubricant-collecting tray. For example, the cheek, as viewed in cross-section, is bent starting at the inner circumference, resulting in a corresponding angular structure over which the lubricant can be guided.

According to an expedient further development, the annular collection space can be wider in the radial direction in the region of the feed port having a smaller opening cross-section than in the region of a feed port having a larger opening cross-section. Accordingly, the collection space is asymmetrical, viewed in the circumferential direction, because it locally expands radially to different extents. In the region of the feed port having the smaller opening cross-section, there is therefore a slightly larger oil reservoir than at other port positions, where more oil is discharged via the feed ports. As an alternative to a radial variation, it is also conceivable to design the collection space to be slightly higher or lower for local variation in the axial direction. This can also be used to achieve an asymmetrical design.

In addition to the planetary gearbox itself, the present disclosure also relates to a lubricant-collecting tray for a planetary gearbox of the type described above. The lubricant-collecting tray has a collection space delimited by a bottom and at least two hollow feed ports projecting axially from the bottom and communicating with the collection space. The feed ports may have at least partially different opening cross-sections.

The feed ports can each have a bore, and the bore diameters may be different in order to vary the opening cross-section. Alternatively, one or more feed ports can also have an orifice which reduces the flow cross-section, e.g., provided at the end of the feed port which is open towards the collection space. Both alternatives make it easy to vary the opening or flow cross-section accordingly.

The annular collection space can be wider in the radial direction or higher in the axial direction in the region of the feed port having a smaller opening cross-section than in the region of a feed port having a larger opening cross-section.

BRIEF DESCRIPTION OF THE DRAWINGS

The present disclosure is explained below on the basis of exemplary embodiments with reference to the drawings. The drawings are schematic representations, in which.

DETAILED DESCRIPTION

Figure 1:
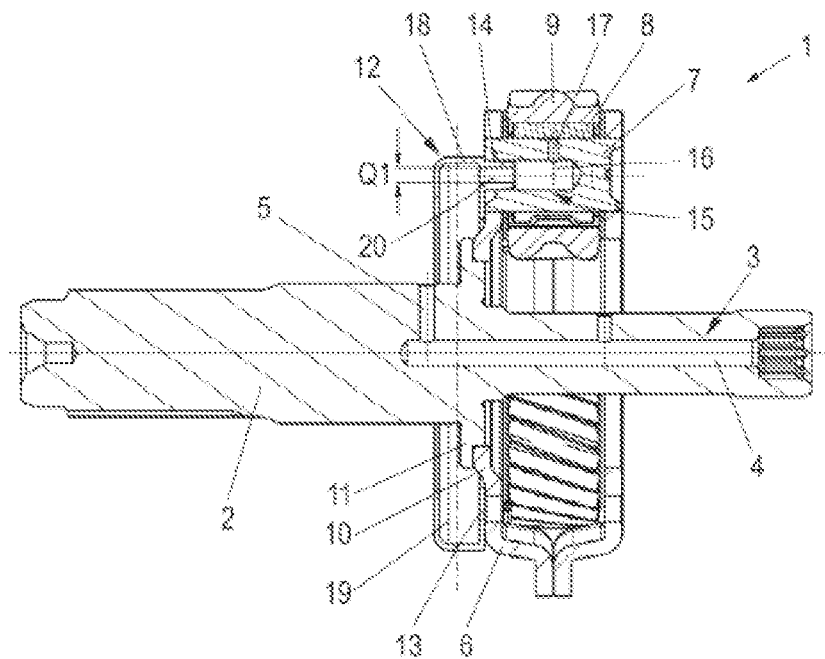
FIG. 1 shows a schematic representation of a planetary gearbox in a sectional view in a first sectional plane, which runs through the shaft-side channel and a feed port of the lubricant-collecting tray lying in this sectional plane.

FIG. 1 shows a schematic representation of a planetary gearbox 1 according to the disclosure, including a shaft 2 having a channel structure 3 with an axially extending channel 4 and a channel 5 branching off radially therefrom, which opens on the outer face of the shaft 2. A lubricant can be fed from the axial direction via this channel structure 3.

Furthermore, a planetary carrier 6 is provided, on which a plurality of planetary pins 7 (three in the example shown) is arranged, and a planetary gear 9 is arranged on each planetary pin 7 via a bearing 8 in the form of a rolling bearing. The planetary carrier 6 has a cheek 10 on one side, via which it is fastened to a flange 11 of the shaft 2. The flange 11 is bent, i.e., angled. This bent or angled structure forms a lubricant guide structure via which the lubricant can be guided in a targeted manner, as described below.

Also provided is a lubricant-collecting tray 12, e.g., made of plastic, which is annular and has a bottom 13 from which three hollow feed ports 14 project axially, corresponding to the number of planetary pins 7. Each hollow feed port 14 engages in a channel structure 15 of the respective planetary pin 7, which includes an axially extending channel 16 and a channel 17 branching off radially therefrom and opening below the bearing 8.

The lubricant-collecting tray 12 also has a tray edge 18, which extends axially from the bottom 13 and is then drawn radially inwards, so that a circumferential collection space 19 is formed by means thereof in conjunction with the bottom 13. The lubricant-collecting tray 12 is open, as viewed axially, so that lubricant escaping from the channel 5 can enter the lubricant-collecting tray 12 and be collected in the collection space 19. As viewed axially, the arrangement is ultimately closed, as the cheek 10 adjoins the bottom 13, so that a lubricant guide is provided. The lubricant-collecting tray 12 is only open towards the planetary pins 7 via the hollow feed ports 14.

The feed port 14 shown in the sectional view according to FIG. 1 is located practically in a radial extension or in the same plane as the opening of the channel 5. The feed port 14 has a cylindrical bore 20, which has a first inner diameter, via which a first opening cross-section Q1, which can also be referred to as the flow cross-section, is defined. This opening cross-section Q1 is small or, in comparison to all of the feed ports 14, the smallest opening cross-section of all feed ports. This is because most of the lubricant collects in this region of the lubricant-collecting tray 12 or the collection space 19, as this region is directly adjacent to the opening of the channel 5.

Figure 2:
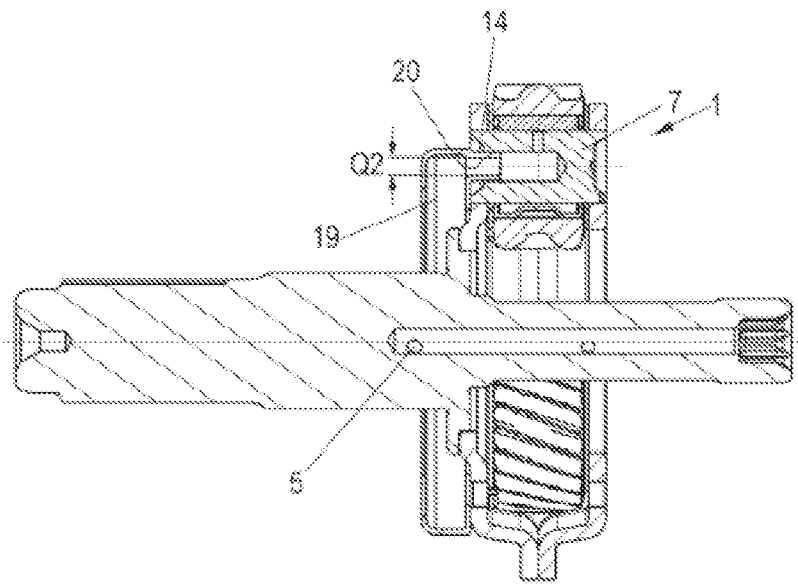
FIG. 2 shows the planetary gearbox of FIG. 1 in a sectional view along a sectional plane, offset by 120° in the example, which runs through a feed port offset by 120° relative to the feed port of FIG. 1.

FIG. 2 shows the planetary gearbox of FIG. 1 in a further sectional view, which here, with three planetary pins 7, is offset by 120° to the sectional plane of FIG. 1. The sectional view runs through a second feed port 14, which opens into the corresponding planetary pin 7, which is inevitably also positioned offset by 120° to the planetary pin 7 of FIG. 1. The hollow feed port 14 also has a cylindrical bore 20 here, but its inner diameter is slightly larger than the inner diameter of the bore 20 of the feed port 14 in FIG. 1. As a result, the feed port 14 in FIG. 2 has a slightly larger opening cross-section Q2 than the feed port 14 in FIG. 1 with its opening cross-section Q1. This means that slightly more lubricant can be fed from the collection space 19 into the planetary pin 7 via the feed port 14 in FIG. 2 than via the feed port 14 in FIG. 1 with its smaller opening cross-section Q1. This can take account of the fact that slightly less lubricant accumulates in the region of the collection space 19 adjacent to the feed port 14 of FIG. 2 than in the collection space region opposite the feed port of FIG. 1, because the feed port 14 of FIG. 2 is offset by 120° to the feed port 14 of FIG. 1 as described and thus also to the opening of the channel 5 indicated in FIG. 2.

These different opening cross-sections Q1 and Q2 can ensure that a sufficient quantity of lubricant can also be supplied to the respective planetary pins 7 and thus to the bearings 8 via the feed ports 14, which are offset in the circumferential direction to the opening of the channel 5, after a reduced quantity is supplied to the planetary pin 7 directly adjacent to the opening of the channel 5. This means that the inhomogeneity or inequality of the lubricant quantity accumulating in the collection space 19 can be compensated for via the different opening cross-sections.

FIGS. 1 and 2 show a variation of the opening cross-sections by means of different inner diameters of the hollow-cylindrical bores 20, wherein the further away in the circumferential direction the respective feed port 14 is positioned from the opening of the channel 5, the larger the inner diameter.

Figure 3:
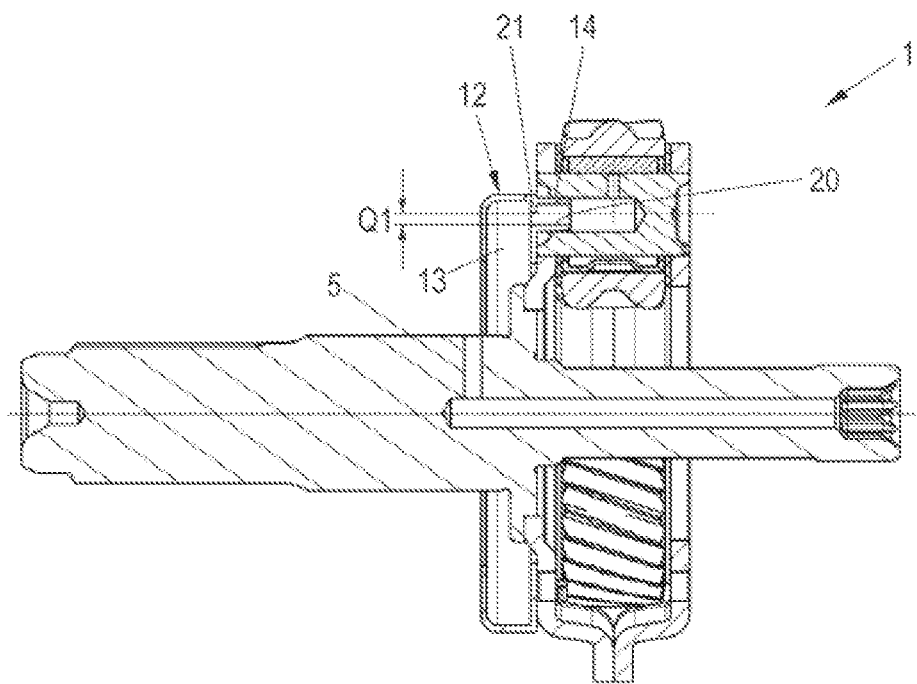
FIG. 3 shows a schematic representation of a planetary gearbox in a second embodiment in a sectional view, which, corresponding to FIG. 1, again runs through the channel and the feed port radially adjacent thereto, the opening cross-section of which is reduced by means of an orifice.

In contrast, FIG. 3 shows an embodiment of a planetary gearbox 1 according to a second embodiment. The basic design is identical to the embodiment shown in FIGS. 1 and 2, which is why reference is made to the relevant explanations: only the design of the lubricant-collecting tray 12 in the region of the feed ports 14 for varying the opening cross-sections is slightly different. Here, again, a sectional view is shown in a plane corresponding to that in FIG. 1. This means that the sectional plane runs through the channel 5 and the radially adjacent feed port 14.

This also has a hollow-cylindrical bore 20. However, it is slightly reduced in cross-section via an orifice 21, which extends virtually radially into the bore 20. The orifice 21 is located in the transition to the collection space 19. This orifice 21 constricts the opening cross-section, which means that the opening cross-section Q1 is smaller. It is smaller than an opening cross-section Q2 of a feed port 14 which is positioned offset in the circumferential direction. The sectional view according to FIG. 2 can be seen in the same way with respect to FIG. 3 and shows a sectional view through the planetary gearbox of FIG. 3 in a sectional plane rotated by 120°. The feed port 14, which is positioned offset by 120°, is not constricted in its opening cross-section by an orifice and therefore has the larger opening cross-section Q2.

In this embodiment, the respective opening cross-section is therefore varied by means of provided orifices, which constrict the bore diameter accordingly.

In the example shown, only three planetary gears and therefore only three planetary pins 7 are provided, and consequently only three feed ports 14. Of course, four or five planetary gears 9, for example, and consequently planetary pins 7 and feed ports 14 can also be provided, which are then positioned at a corresponding pitch around the circumference. In such cases, too, the feed port 14 which, viewed in the circumferential direction, is closest to or, for example, in radial extension of the opening of the channel 5 of the shaft 2, has the smallest opening cross-section, and the opening cross-section increases the further away the following feed ports 14 are positioned from this first feed port 14.

REFERENCE NUMERALS

1 Planetary gearbox
2 Shaft

3 Channel structure
4 Axially extending channel
5 Radially branching channel
6 Planetary carrier
7 Planetary pin
8 Bearing
9 Planetary gear
10 Cheek
11 Flange
12 Lubricant-collecting tray
13 Bottom
14 Feed port
15 Channel structure
16 Axially extending channel
17 Channel
18 Tray edge
19 Collection space
20 Bore
21 Orifice
Q1, Q2 Opening cross-section

The invention claimed is:

1. A planetary gearbox, comprising a shaft having a channel structure for conducting a lubricant, comprising a channel opening on the outer face of the shaft, a planetary carrier, at least two planetary pins which are arranged on the planetary carrier and on which one planetary gear each is mounted, wherein each planetary pin has a channel structure for conducting the lubricant to a bearing of the planetary gear, and a lubricant-collecting tray which has a collection space, for collecting the lubricant supplied via the shaft-side channel, comprising at least two hollow feed ports which each open into a planetary pin-side channel structure for conducting the lubricant into the respective channel structure, wherein a feed port which is positioned, viewed in the circumferential direction, closer to the opening of the channel has a smaller opening cross-section (Q1) than a feed port which is positioned further away.

2. The planetary gearbox according to claim 1, wherein the feed ports each have a bore, wherein the bore diameter is different in order to vary the opening cross-section (Q1, Q2).

3. The planetary gearbox according to claim 1, wherein one or more feed ports have an orifice which reduces the opening cross-section (Q1, Q2) and is provided at the end of the feed port which is open towards the collection space.

4. The planetary gearbox according to claim 1, wherein the planetary carrier has a cheek extending radially to the shaft, using which it is connected to the shaft and which is adjoined by an annular bottom on which the feed ports project axially.

5. The planetary gearbox according to claim 4, wherein the cheek has a lubricant guide structure on the side facing the lubricant-collecting tray.

6. The planetary gearbox according to claim 1, wherein the annular collection space is wider in the radial direction or higher in the axial direction in the region of the feed port having a smaller opening cross-section (Q1) than in the region of a feed port having a larger opening cross-section (Q2).

7. A lubricant-collecting tray for a planetary gearbox according to claim 1, comprising a collection space delimited by a bottom and at least two hollow feed ports projecting axially from the bottom and communicating with the collection space, wherein the feed ports have at least partially different opening cross-sections (Q1, Q2).

8. The lubricant-collecting tray according to claim 7, wherein the feed ports each have a bore, wherein the bore diameter is different in order to vary the opening cross-section.

9. The lubricant-collecting tray according to claim 7, wherein one or more feed ports have an orifice which reduces the flow cross-section and is provided at the end of the feed port which is open towards the collection space.

10. The lubricant-collecting tray according to claim 7, wherein the annular collection space is wider in the radial direction or higher in the axial direction in the region of the feed port having a smaller opening cross-section (Q1) than in the region of a feed port having a larger opening cross-section (Q2).

11. A planetary gearbox, comprising:
a shaft, the shaft comprising a shaft channel for radially conducting a lubricant to an outer face of the shaft;
a planetary carrier;
a first planetary pin arranged on the planetary carrier;
a second planetary pin arranged on the planetary carrier;
a first planetary gear mounted on the first planetary pin via a first bearing, the first planetary pin comprising a first pin channel for conducting the lubricant to the first bearing;
a second planetary gear mounted on the second planetary pin via a second bearing, the second planetary pin comprising a second pin channel for conducting the lubricant to the second bearing; and
a lubricant-collecting tray comprising:
a collection space for collecting the lubricant supplied via the shaft channel;
a first hollow feed port opening into the first pin channel, the first hollow feed port comprising a first opening cross-section; and
a second hollow feed port opening into the second pin channel, the second hollow feed port comprising a second opening cross-section, wherein:
the first hollow feed port is closer to the shaft channel than the second hollow feed port when viewed in a circumferential direction; and
the first opening cross-section is less than the second opening cross-section.

12. The planetary gearbox of claim 11, wherein:
the first hollow feed port comprises a first bore with a first bore diameter; and
the second hollow feed port comprises a second bore with a second bore diameter, different than the first bore diameter.

13. The planetary gearbox of claim 11, wherein the first hollow feed port comprises an orifice disposed on an end of the first hollow feed port open towards the collection space, the orifice arranged for reducing the first opening cross-section.

14. The planetary gearbox of claim 11, wherein:
the planetary carrier further comprises a cheek extending radially to the shaft, the cheek connecting the planetary carrier to the shaft;
the lubricant-collecting tray further comprises an annular bottom, the first hollow feed port and the second hollow feed port projecting from the annular bottom; and
the cheek adjoins the annular bottom.

15. The planetary gearbox of claim 14, wherein the cheek comprises a lubricant guide structure on a side of the cheek facing the lubricant-collecting tray.

16. The planetary gearbox of claim 11, wherein the collection space is radially wider or axially higher near the first hollow feed port than it is near the second hollow feed port.

\* \* \* \* \*